US010454866B2

(12) United States Patent
Yost et al.

(10) Patent No.: US 10,454,866 B2
(45) Date of Patent: *Oct. 22, 2019

(54) OUTBOUND IP ADDRESS REPUTATION CONTROL AND REPAIR

(71) Applicant: Microsoft Technology Licensing, LLC, Redmond, WA (US)

(72) Inventors: David Nicholas Yost, Bellevue, WA (US); Alexander Nikolayev, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/733,732

(22) Filed: Jun. 8, 2015

(65) Prior Publication Data

US 2015/0381537 A1     Dec. 31, 2015

Related U.S. Application Data

(63) Continuation of application No. 13/938,981, filed on Jul. 10, 2013, now Pat. No. 9,065,833.

(51) Int. Cl.
*H04L 12/58*     (2006.01)
*H04L 29/06*     (2006.01)
*H04L 29/12*     (2006.01)

(52) U.S. Cl.
CPC .............. *H04L 51/12* (2013.01); *H04L 51/28* (2013.01); *H04L 61/2007* (2013.01); *H04L 63/101* (2013.01)

(58) Field of Classification Search
CPC ....................................... H04L 51/12
USPC ........................................................... 726/29
See application file for complete search history.

(56) References Cited

U.S. PATENT DOCUMENTS

| | | | |
|---|---|---|---|
| 6,988,148 B1 * | 1/2006 | Sheth ................ | H04L 29/12283 709/220 |
| 7,054,907 B1 | 5/2006 | Sherwood | |
| 7,155,608 B1 | 12/2006 | Malik et al. | |
| 7,197,549 B1 * | 3/2007 | Salama ............. | H04L 29/12283 709/223 |
| 7,673,043 B2 | 3/2010 | Keir et al. | |
| 7,805,518 B1 | 9/2010 | Kamvar et al. | |

(Continued)

OTHER PUBLICATIONS

Filtering Spam with Behavioral Blacklisting, Anirudh Ramachandran, Nick Feamster, and Santosh Vempala, CCS'07, Oct. 29-Nov. 2, 2007.

(Continued)

*Primary Examiner* — Peter C Shaw
(74) *Attorney, Agent, or Firm* — Merchant & Gould P.C.

(57) ABSTRACT

Embodiments provide IP address partitioning features that can be used to source outbound email communications, but the embodiments are not so limited. In an embodiment, a computer-based method operates to remove blocked or potentially misused IP addresses from a partition and/or move good or reputable IP addresses from other partitions to account for volumetric shortfalls. A method of one embodiment operates to repair removed IP address reputations as part of recycling and reusing IP addresses. A system of an embodiment is configured in part to remove misused IP addresses from one or more partitions, source reputable IP addresses from other partitions, and/or repair and reuse IP addresses as needed. Other embodiments are included.

20 Claims, 8 Drawing Sheets

(56) References Cited

U.S. PATENT DOCUMENTS

| | | | |
|---|---|---|---|
| 7,849,146 | B2 | 12/2010 | Choi et al. |
| 7,890,627 | B1 | 2/2011 | Thomas |
| 7,953,814 | B1 | 5/2011 | Chasin et al. |
| 8,189,473 | B1* | 5/2012 | Breau ............... H04L 29/12216 370/235 |
| 8,560,616 | B1* | 10/2013 | Diac ....................... H04L 51/28 370/466 |
| 8,613,089 | B1 | 12/2013 | Holloway |
| 8,990,316 | B1 | 3/2015 | Feinstein |
| 2003/0065943 | A1* | 4/2003 | Geis .................... H04L 63/1408 726/4 |
| 2004/0059830 | A1 | 3/2004 | Brown |
| 2005/0021649 | A1 | 1/2005 | Goodman et al. |
| 2005/0122946 | A1* | 6/2005 | Won .................. H04L 29/12283 370/338 |
| 2005/0257264 | A1 | 11/2005 | Stolfo |
| 2005/0267929 | A1* | 12/2005 | Kitamura ................ G06F 3/061 709/201 |
| 2006/0031483 | A1 | 2/2006 | Lund et al. |
| 2006/0059238 | A1 | 3/2006 | Slater et al. |
| 2006/0168024 | A1 | 7/2006 | Mehr et al. |
| 2006/0277259 | A1 | 12/2006 | Murphy et al. |
| 2006/0288076 | A1 | 12/2006 | Cowings |
| 2008/0082662 | A1 | 4/2008 | Dandliker et al. |
| 2008/0177994 | A1 | 7/2008 | Mayer |
| 2008/0208980 | A1* | 8/2008 | Champan ............. G06Q 10/107 709/206 |
| 2008/0235801 | A1 | 9/2008 | Soderberg et al. |
| 2008/0320119 | A1 | 12/2008 | Achan et al. |
| 2009/0037469 | A1 | 2/2009 | Kirsch |
| 2009/0216841 | A1 | 8/2009 | Choi et al. |
| 2009/0254970 | A1 | 10/2009 | Agarwal |
| 2009/0300720 | A1* | 12/2009 | Guo ..................... G06Q 10/107 726/3 |
| 2010/0077040 | A1* | 3/2010 | Hariharan ............. H04L 12/585 709/206 |
| 2010/0082811 | A1 | 4/2010 | Van Der Merwe |
| 2010/0095374 | A1* | 4/2010 | Gillum .................. G06Q 30/02 726/22 |
| 2010/0100962 | A1 | 4/2010 | Boren |
| 2010/0211997 | A1 | 8/2010 | McGeehan et al. |
| 2010/0262662 | A1* | 10/2010 | Wang .................. G06Q 10/107 709/206 |
| 2010/0268799 | A1 | 10/2010 | Maestas |
| 2010/0313264 | A1 | 12/2010 | Xie et al. |
| 2010/0325213 | A1 | 12/2010 | Harris, III |
| 2010/0332607 | A1* | 12/2010 | Seon ....................... H04L 51/12 709/206 |
| 2011/0055923 | A1 | 3/2011 | Thomas |
| 2011/0289168 | A1 | 11/2011 | Allam et al. |
| 2011/0314119 | A1* | 12/2011 | Kakadia ............ H04L 29/12066 709/213 |
| 2012/0174220 | A1 | 7/2012 | Rodriguez |
| 2012/0191855 | A1 | 7/2012 | Alexander |
| 2013/0041966 | A1 | 2/2013 | Duan |
| 2013/0125205 | A1* | 5/2013 | Hsu ....................... H04W 12/06 726/3 |
| 2013/0291107 | A1* | 10/2013 | Marck ................... G06F 21/316 726/23 |
| 2013/0347113 | A1 | 12/2013 | Yu et al. |
| 2014/0304414 | A1* | 10/2014 | Yengalasetti, Sr. .......................... H04L 67/1036 709/226 |
| 2015/0020193 | A1 | 1/2015 | Yost et al. |
| 2015/0020219 | A1 | 1/2015 | Yost et al. |
| 2016/0366081 | A1 | 12/2016 | Yost et al. |
| 2016/0373405 | A1* | 12/2016 | Miller ................. H04L 63/0236 |

OTHER PUBLICATIONS

International Search Report & Written Opinion for PCT Application No. PCT/US2014/045508, dated Apr. 7, 2015, 15 pages.

Mathur, et al., "Detecting Hidden Enemy Lines in IP Address Space", In Proceedings of the Workshop on New Security Paradigms Workshop, Dec. 9, 2013, pp. 19-30.

Radlinski, "Addressing Malicious Noise in Clickthrough Data", In Proceeding of the Learning to Rank for Information Retrieval Workshop at SIGIR, Dec. 2007, 6 pages.

U.S. Appl. No. 13/938,916, Non-Final Rejection dated Jun. 29, 2015, 24 pages.

U.S. Appl. No. 13/938,981, Amendment and Response filed Apr. 24, 2015, 6 pages.

U.S. Appl. No. 13/938,981, Notice of Allowance dated Feb. 18, 2015, 14 pages.

Cisco Service Control Service Security: Outgoing Spam Mitigation Solution Guide, Release 3.8.x, Published on: Sep. 17, 2012, Available at: http://www.cisco.com/en/US/docs/cable/serv_exch/serv_control/broadband_app/rel38x/service_security_spam/service_security_spam.pdf, 18 pages.

FortiMail™ Email Security Appliances, Retrieved on: May 1, 2013, Available at: http://www.fortinet.in/products/fortimail/index.html, 2 pages.

Frequently Asked Questions, Published on: Sep. 28, 2008, Available at: http://www.reputationauthority.org/faq.php, 4 pages.

Hong, et al., "Populated IP Addresses—Classication and Applications", In Proceedings of the ACM Conference on Computer and Communications Security, Oct. 16, 2012, 12 pages.

International Search Report and Written Opinion for Application No. PCT/US2014/045509 dated Jan. 20, 2015.

IP Reputation, the Most Powerful Tool in the Fight Against Unwanted Bulk Email (UBE) and Spam, Published on: Jan. 22, 2009, Available at: http://www.linuxmagic.com/power_of_ip_reputation, 4 pages.

Macnutt, Margot, "How do You Fix a Bad Reputation?", Published on: Jan. 6, 2010, Available at: http://www.vircom.com/security/how-do-you-fix-a-bad-reputation/, 2 pages.

Mitigating Outgoing Spam, DoS/DDoS Attacks and Other Security Threats, Retrieved on: Apr. 30, 2013, Available at: http://www.rgrcom.ru/catalog/allot/solutions/Security%20Solution%20Brief.pdf, 10 pages.

Proofpoint Email Spam Detection, Published on: Nov. 13, 2011, Available at: http://www.proofpoint.com/products/protection/spam-detection.php, 3 pages.

Road Runner Mail Blocks, Published on: Dec. 17, 2008, Available at: http://security.rr.com/mail_blocks.htm, 8 pages.

Sharma, et al., "Classifying Populated IP Addresses using SVM Clustering and Vertical Partition ID3 Decision Tree", In International Journal of Computer Science and Information Technologies, vol. 4, Issue 1, Retrieved on: Apr. 30, 2013, 3 pages.

Sirivianos, et al., "Introducing Social Trust to Collaborative Spam Mitigation", Retrieved on: Apr. 30, 2013, Available at: http://www.cs.duke.edu/~msirivia/publications/socialfilter-infocom-tech-report.pdf, 11 pages.

Smart Outbound Relay, Published on: Oct. 30, 2011, Available at: http://www.mailchannels.com/literature/mailchannels-smart-outbound-relay.pdf, 2 pages.

Troubleshooting, Published on: Dec. 3, 2010, Available at: http://mail.live.com/mail/troubleshootingaspx, 4 pages.

TurnTide Introduces Outbound Anti-Spam Router; Service Provider Iowa Telecom Prevents Outbound Spam with ASR, Published on: Apr. 20, 2004, Available at: http://www.thefreelibrary.com/TurnTide+Introduces+Outbound+Anti-Spam+Router%3B+Service+Provider+Iowa...-a0115552824, 3 pages.

Zink, Terry, "Our Latest Outbound Spam Mitigation Technique", Published on: Nov. 18, 2010, Available at: http://blogs.msdn.eom/b/tzink/archive/2010/11/18/our-latest-outbound-spam-mitigation-technique.aspx, 2 pages.

U.S. Appl. No. 13/938,916, Amendment and Response filed Oct. 8, 2015, 17 pages.

U.S. Appl. No. 13/938,916, FOA dated Jan. 6, 2016, 31 pages.

PCT International Preliminary Report on Patentability in Application PCT/2014/045508 dated Jan. 12, 2016, 7 pages.

U.S. Appl. No. 13/938,916, Amendment and Response filed Mar. 28, 2016, 17 pages.

U.S. Appl. No. 13/938,916, Notice of Allowance dated May 20, 2016, 23 pages.

(56) References Cited

OTHER PUBLICATIONS

U.S. Appl. No. 13/938,916, Notice of Allowance dated Aug. 29, 2016, 21 pages.
U.S. Appl. No. 15/248,037, Office Action dated Oct. 7, 2016, 25 pgs.
U.S. Appl. No. 15/248,037, Amendment and Response filed Jan. 9, 2017, 13 pgs.
U.S. Appl. No. 15/248,037, Notice of Allowance dated Apr. 17, 2017, 28 pgs.
U.S. Appl. No. 15/248,037, Notice of Allowance dated May 12, 2017 15 pgs.
U.S. Appl. No. 15/248,037, Amendment after Allowance filed May 26, 2017, 8 pgs.
U.S. Appl. No. 15/248,037, Notice of Allowance dated Jun. 15, 2017, 15 pgs.

* cited by examiner

OUTBOUND IP ADDRESS REPUTATION CONTROL AND REPAIR

CROSS-REFERENCE TO RELATED APPLICATIONS

This application is a continuation of, and claims priority to, Non-Provisional patent application Ser. No. 13/938,981, filed Jul. 10, 2013, issued as U.S. Pat. No. 9,065,833, and entitled "OUTBOUND IP ADDRESS REPUTATION CONTROL AND REPAIR," which application is incorporated herein by reference in its entirety.

BACKGROUND

When dealing with multiple customers sharing the same outbound Internet Protocol (IP) space if one of the customers is compromised and starts sending spam it can result in all customers who share the IP space being blocked. Once an IP address is flagged as abusive, it may take days or weeks to repair, during which time email from the IP address may be blocked or throttled. One cannot simply replace a blocked IP address with a new IP address since the new IP address may not have a reputation for sending email which can result in further blocking or throttling if used. Depending on the time to resolution, customer business could encounter a serious setback if unable to timely send its email.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments provide IP address partitioning features that can be used to source outbound email communications, but the embodiments are not so limited. In an embodiment, a computer-based method operates to remove blocked or potentially misused IP addresses from a partition and/or move good or reputable IP addresses from other partitions to account for volumetric shortfalls. A method of one embodiment operates to repair removed IP address reputations as part of recycling and reusing IP addresses. A system of an embodiment is configured in part to remove misused IP addresses from one or more partitions, source reputable IP addresses from other partitions, and/or repair and reuse IP addresses as needed. Other embodiments are included.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Figure 1:
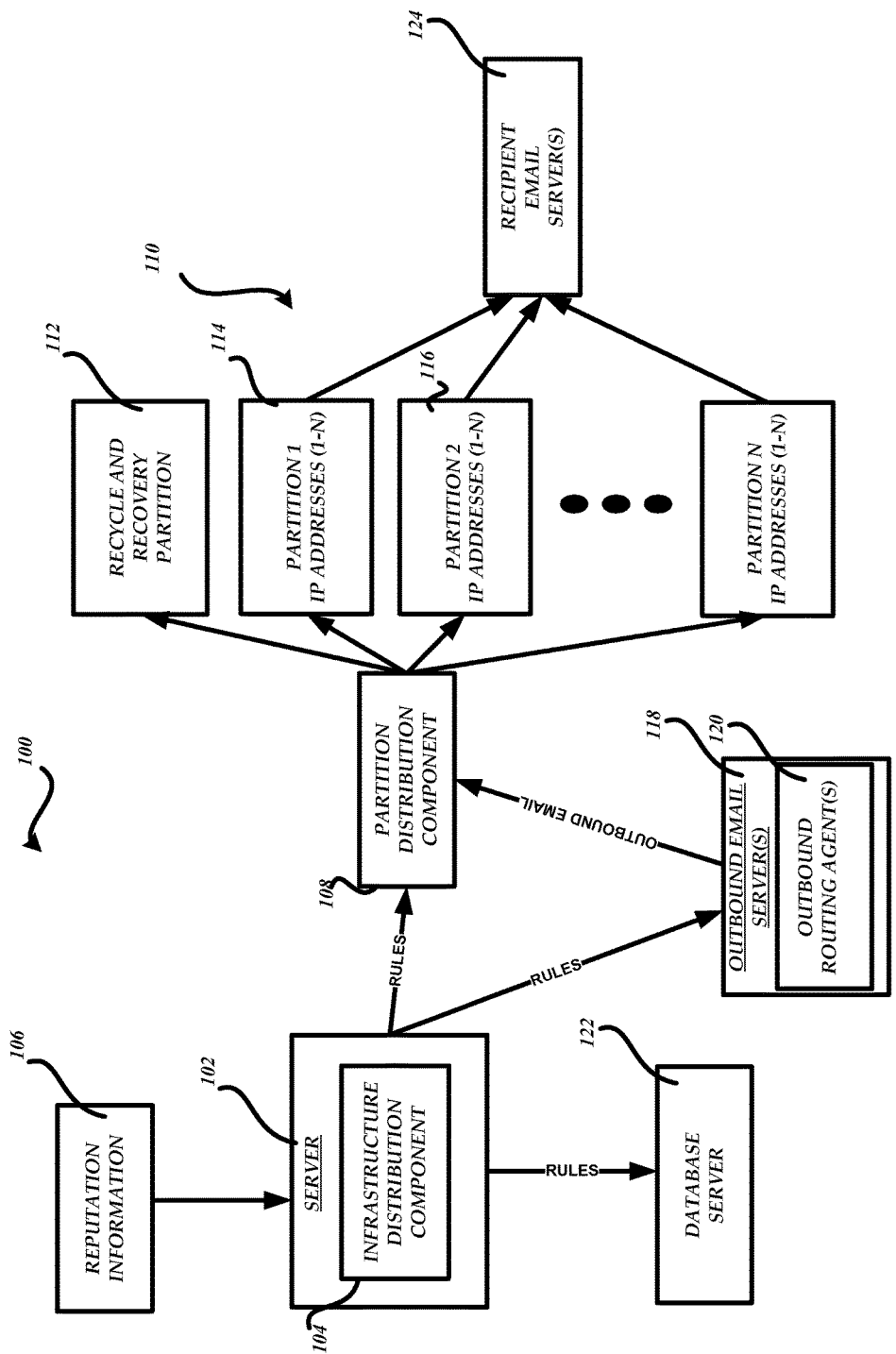
FIG. 1 is a block diagram of an exemplary computing or communication architecture.

FIG. 1 is a block diagram of an exemplary computing or communication architecture 100 used in part to provide electronic email features, but is not so limited. As shown in FIG. 1, the exemplary architecture 100 includes at least one server computer 102. While one server is shown, it will be appreciated that complex communication architectures typically employ multiple server computers, networking components, and other hardware and software components. Components of the exemplary architecture 100 can communicate and interact by way of wired and/or wireless networks.

As described below, components of the exemplary architecture 100 operate in part to mitigate the impact on customer outbound email communications (referred to as outbound email) in a service where multiple customers share an IP space. For example, an email hosting service can use IP reputation and/or volume information to identify and isolate potentially abusive email practices, wherein the IP reputation and/or volume information can be used to remove compromised IP addresses and/or move IP addresses between partitions of a datacenter or datacenters in an intelligent fashion to ensure that email flow continues. As described below, components of the exemplary architecture 100 of an embodiment are configured to detect or identify when an IP address of an original partition is blocked, remove or move the blocked IP address from the original partition, and/or source reputable or good IP addresses from other partitions to compensate for volumetric deficiencies resulting from the removal of an IP address.

Further action can be taken to recycle a potentially misused IP address or mark a potentially misused IP address as a bad IP address. For example, a potentially misused IP address can be isolated using a dedicated recycling partition and repair measures applied to clear or recycle the potentially misused IP address. In one embodiment, a repair process first ensures that a potentially misused IP address has been removed from a blacklist or other blocking list (e.g., by manual and/or automatic inspection) before using the previously blocked and now reused IP address as part of the original or new sourcing partition to source outbound email at a lower volume as compared to other IP addresses of the original or new sourcing partition. The volume of outbound email sourced using a reused IP address can be slowly increased over time to regain a volume reputation as well as reducing or preventing further blocking as a result of a prohibitive surge in volume.

Components of the exemplary architecture 100 can also be configured to mitigate potentially abusive email practices by identifying and/or isolating potentially offending customers while allowing non-offending customers who share a partition to continue sending email with little or no disruption. In an embodiment, a process can be used with the components to isolate potentially offending customers using multiple partitions of IP addresses, wherein each partition is used to serve groups of customers who each share a subset of the IP addresses.

A process of one embodiment operates when an entire partition is blocked or multiple IP addresses of a partition are blocked due to a customer sending spam or some other abusive email practice, wherein the process operates to split or divide the partition into a number of new sub-partitions with each new sub-partition being assigned a new unblocked IP address. The process is configured to drill down into the partitioned customer base to locate a potentially offending customer while allowing customers to start sending email again using new IP addresses. If the customer who was sending spam continues, it will result in the new IP address (and sub-partition) being blocked, wherein the process will then split the customers associated with the blocked sub-partition into a number of new sub-partitions while recombining non-offending customers using the original or a new partition with multiple new IP addresses. The process repeats until there are no blocked sub-partitions or each blocked sub-partition includes a single customer isolated from other non-offending customers.

The description of FIG. 1 encompasses, but is not limited to, service provider networks wherein a service provider or host utilizes multiple IP addresses as part of providing outgoing electronic mail (email) services to a plurality of customers. The server 102 of an embodiment includes an infrastructure distribution (IFD) component 104 configured to manage application and use of various IP addresses using a number of sourcing partitions or pools and/or rules in part to host outbound emails for the various customers. For example, the IFD component 104 can be used to define rules that identify which particular IP addresses are to be used to source outbound emails, wherein each partition is used to define the one or more IP addresses to use when sourcing.

The IFD component 104 of an embodiment is installed as role on server 102 and configured to automatically remove blocked, damaged, and/or otherwise unhealthy reputation IP addresses from active service. The IFD component 104 is also configured to rebuild volume reputations or sending histories for previously removed IP addresses in part by defining rules that control the volume of allowed outbound email. As described below, the IFD component 104 can operate to remove potentially misused IP addresses as well as using IP address resources from other partitions to compensate for removal of a potentially misused IP address. A potentially misused IP address of one embodiment can be defined as an IP address that has been blocked, blacklisted, or otherwise compromised and has not been repaired or reapplied.

IP addresses assigned to each partition may be transferred between partitions as needed to replace IP addresses marked as bad or potentially misused in order to maintain the volume of emails for the IP addresses in a partition at the same or about the same relative level. A potentially misused IP address may result from an inadvertent customer action such as sending to an improper IP address for example. It is also possible for multiple IP addresses of a partition or an entire partition of IP addresses to be blocked and the IFD component 104 can be used to isolate an offending customer as well as enabling other non-offending customers to continue to send email.

As described below, the IFD component 104 can operate in part to isolate one or more customers whose email practices may be misusing an IP address while minimizing impact or interruption of other customer outbound emails that may sharing a misused IP address. The IFD component 104 of an embodiment includes complex programming code configured to use partitioning logic and a plurality of partitions or pools of IP addresses to source outbound emails for one or more customers associated with each partition. For example, an email hosting service can use partitioning logic with 200 IP addresses to support the sourcing of outbound emails for 100 customers using 20 partitions with 5 different IP addresses for each partition.

The IFD component 104 of an embodiment is configured to identify and isolate offending or potentially offending customers as well as removing and/or repairing IP addresses that have been identified as being misused or potentially misused. The repairing or healing of a removed IP address requires that the removed IP address is not blocked, blacklisted, or otherwise compromised and/or does not have a desired volume reputation. For example, an IP address that has been cleared from being blacklisted will most likely need to rebuild a desired volume reputation associated with the amount of emails sent daily as compared with other customers sharing the IP addresses of the partition.

The IFD component 104 can generate rules that allow for a controlled repair process of a misused IP address by slowly or moderately increasing outbound email volume until reaching a desired or defined volume level or load. For example, on day one, an IP address under repair may only source 1% of the total email volume for a partition, while the other IP addresses take 10% each. After a certain amount of time, the rules can be used to control further increasing of email volume for the IP address under repair until reaching an equal or substantially equal percentage of volume as the other IP addresses in the partition.

As shown in FIG. 1, the IFD component 104 uses reputation information 106 to monitor partitions of IP addresses used to source outbound emails. For example, reputation information 106 can be provided by a blacklist or blocking monitoring service as well as in-house IP reputation monitors to identify IP addresses used to promote potentially abusive email practices that may adversely affect reputation. IP reputation of an embodiment is a measure that indicates how trustworthy third parties or other entities view an IP address. For example, a blacklisting or IP monitoring service can review emails and/or volume of emails being sent to provide an IP reputation measure that can be used in identifying blocked IP addresses and/or partitions.

An IP reputation measure of one embodiment can be used to define good and/or bad IP addresses. A good IP address of an embodiment is defined as an IP address that is not currently blocked or blacklisted and has a history of sending some defined volume or amount of email. A bad IP address of an embodiment pertains to an IP address that is blocked or throttled from sending all of its email. The IFD component 104 can use the reputation information 106 in part to define rules that separate email of different groups of customers into different partitions or pools of outbound IP addresses to reduce the impact on a number of customers being blocked or affected.

As shown for the example of FIG. 1, the architecture 100 includes a plurality of logical partitions (collectively referred to as 110) that are used as part of sourcing outbound emails for a plurality of customers. According to an embodiment, the recycle and repair partition 112 is used as part of isolating and repairing removed IP addresses, such as IP addresses that have been previously blocked or blacklisted, so that once repaired, a previously removed IP address can be reinserted into an original partition or a new partition. For example, a recycled IP address can be moved from the recycle and repair partition 112 to a partition to supplement the removal of a bad IP address. The recycle and repair partition 112 of one embodiment can also be used to build the volume reputation of removed or other types of IP addresses.

The IFD component 104 can use the partitions 110 to source different IP addresses for different customers, wherein the customers may be grouped together and assigned to one or more partitions based on any number of factors (e.g., number of employees, non-competing companies, similar outbound email volumes, reputations, etc.). For example, partition 114 may be used to source 5 different IP addresses for a first group of associated customers, whereas partition 116 may be used to source 10 different IP addresses for a second group of associated customers. It will be appreciated that various implementations may use different numbers of IP addresses to use with each partition as well as identifying a number of customers to source using the partition.

As described briefly above, the IFD component 104 can be configured programmatically to use the reputation information 106 to generate rules that define which partitions are to be used to source which customer communications and/or an amount of outbound email volume allowed over some period of time. As shown for the example of FIG. 1, the IFD component 104 of an embodiment is configured to forward rules to a partition distribution component 108, such as a network load balancing device for example. The partition distribution component 108 of one embodiment allows custom delivery and IP transformation rules to be created and applied according to the rule inputs provided by the IFD component 104.

The IFD component 104 of one embodiment can use an application programming interface (API) (e.g., "IControl" API) to convey rules that enable the partition distribution component 108 to create partitions with defined IP addresses and/or customers to serve, remove one or more IP addresses from a partition, and/or move IP addresses between partitions as part of managing a volume of email handled by each IP address of a partition. The IFD component 104 can communicate with a database server 122 that includes a rule database including an IP list table or other data structure to store data for rules used by the partition distribution component 108 and/or outbound mail server 118.

As described briefly above, the rules can be used in part to define pools or partitions 110 of IP addresses used to source outbound emails of one or more customers associated with each of the partitions 110. For example, the rules can define a virtual forwarding IP (VIP) address of a target for an "Irule" that sets the source address on communications leaving a networked datacenter, wherein each VIP address targets a partition that includes a plurality of assigned IP addresses. An Irule can be described as a script written to specify individual connections to target a pool other than a default pool defined for a virtual server which allows for the specifying of destinations for traffic to be directed.

In one embodiment, the IFD component 104 generates a rule for the partition distribution component 108 to remove a bad IP from a partition and move the bad IP to the recycle and recovery partition 112 when the bad IP or the associated partition is blocked from sending email which allows customers associated with the partition to continue to send email with minimal disruption regardless of the reason for blocking. In one embodiment, the server 102 includes an IP address monitoring component that operates to provide reputation information 106 including good IP, bad IP, and/or other reputation or volume information.

The IFD component 104 is configured in part to account for volumetric changes in amounts of outbound email apportioned to remaining IP addresses of an affected partition by sourcing good or reputable IP addresses from other partitions to alleviate impact on associated customers when a previously used IP address is no longer available for outbound emails. The IFD component 104 can generate rules to ensure that no more than a certain percentage or volume of customer outbound email is impacted at the same time or some other time, wherein the percentage or volume of customer outbound email of one embodiment can be made dependent on the number of available IP addresses in the current partition or another sourcing partition. As an example, once an IP address or a partition becomes blocked, the IFD component 104 generates a rule such that the partition distribution component 108 removes the bad IP and/or moves one or more good or reputable IP addresses to reduce the blocking of non-offending customer email.

As described above, the reputation information 106 can be used to identify when one IP address, multiple IP addresses, or an entire partition of IP addresses is blocked. When multiple IP addresses or an entire partition is blocked, the IFD component 104 can generate rules for the partition distribution component 108 to split the customers of an affected partition into a number of sub-partitions (see the example of FIG. 6) sourcing good IP addresses of other partitions. If a new IP address of a sub-partition is blocked, the IFD component 104 identifies that an offending customer is in that sub-partition. The other sub-partitions that are not blocked can be recombined back into the original partition or a new partition along with new assigned IP addresses. The rules can also instruct the partition distribution component 108 to split the customers of the blocked sub-partition into new sub-partitions and repeat the process until isolating a single customer per partition to identify one or more offending customers.

The outbound mail server 118 of an embodiment includes an outbound routing agent 120 that operates to rout agent outbound email to multiple targets based on rules read from the rule database 122. If there are no rules in the rule database 122, the outbound mail server 118 will route email using a default partition (e.g., port 25). The outbound routing agent 120 of an embodiment controls an outbound IP address by changing an outbound port used on the outbound connections or couplings. The partition distribution component 108 can also use rules of the rule database 122 to modify a connection or coupling and change an outbound IP address seen by the recipient email server 124 coupled through one or more networks to match a desired IP address included in a partition.

The rule database 122 of an embodiment stores outbound routing rules that use email header information as part of applying the outbound routing rules. Example criteria that the outbound routing rules can use for matching a desired IP address include: sending Customer company ID; if the message has been marked as spam; if the message has been marked as bulk; and/or if the message is from a trial customer.

Outbound routing rules of one embodiment use the following parameters:

RuleID: (Unique RuleID, added to header of email if rule matched);

RuleCaptureValue: A regular expression with a capture to get a target value to compare. Example: " X-SpamScore: ([0-9]+)";

RuleValue: The value to which the rule compares;
RuleOperator: Example values "=,<=,>=,regex, Hash<=,Hash>=";
SubRule: If there is a subrule that also needs to match it is applied here. −1 indicates there is no sub rule;
RulePriority: The priority level of the rule. Used to determine in which order the rules are applied, from lowest value to highest. The system stops once a rule that applies is hit; and/or
TargetPartition: The partition to use if the rule matches.

As an implementation example, a format for a target partition can be configured as "(Name): Port" example: Outbound: 550 or Spam: 55. The IFD component 104 can also use a number of alerts upon encountering an issue while operating. For example, the IFD component 104 can provide an alert when: unable to connect to a reputation component get IP reputation information; unable to access the partition distribution component 108; an error is encountered on the partition distribution component 108; upon reaching a threshold of bad IP addresses for a datacenter; and/or unable to access the database server 122 or upon a failure to access an IP List database.

The IFD component 104 of one embodiment operates as a control program and makes a call to check whether there are any bad IP addresses of any associated datacenters. For example, a host may implement 10 datacenters, wherein each datacenter may use 200 IP addresses to source outbound emails, resulting in managing of 2,000 IP addresses across all datacenters, wherein the IFD component 104 can be configured to manage one or multiple datacenters. The IFD component 104 can use a number of performance counters to count the number of IP addresses evaluated in a last run and/or the number of bad IP addresses removed in the last run. The IFD component 104 can also track the number of IP addresses moved in the last run and/or the number of IP addresses repaired in the last run. The architecture 100 is scalable and can include multiples of data centers and IP addresses associated with each data center.

The IFD component 104 of one embodiment uses a configuration file that contains multiple configuration values to manage partitions 110. The configuration file of one embodiment includes: 1) a fully qualified domain name (FQDN) of one distribution serve (here may be multiple entries, one for each data center floating IP address); 2) a maximum number of bad IP addresses associated with the maximum number of bad IP addresses identified in each data center; 3) the IP reputation data source that contains the address from which the IFD component 104 obtains IP reputation information 106; and/or 4) a maximum repair growth rate that controls the maximum percentage to increase load on each partition or IP address each day or at some other interval.

In an embodiment, the IFD component 104 is accessed as a command line utility run with different parameters to perform different functions. The IFD component 104 of one embodiment is configured to call a monitor parameter as a scheduled task to receive the reputation information 106 and check if any IP addresses of one or more datacenters have been marked as bad or misused IP addresses and if any action is required by the partition distribution component 108. In an embodiment, the IFD component 104 uses the monitor parameter to perform the following steps: 1) download current (e.g., yesterday, last 3 days, etc.) IP reputation data from one or more IP reputation data sources; 2) query the partition distribution component 108 in the configuration file for the current status of which IP addresses are located in each partition and/or datacenter and/or IP connection statistics; 3) move any IP addresses marked as bad out of the associated partition; and/or 4) move one or more good IP addresses from one or more other partitions to rebalance the load as needed.

The IFD component 104 can also be configured to call (e.g., daily, every 2 days, etc.) a repair parameter to repair IP address reputations by increasing an amount of volume percentage of allowed outbound emails for a defined time or period. In an embodiment, the IFD component 104 uses the repair parameter to perform the following steps: 1) query the partition distribution component 108 (may be multiple such components) for current IP addresses of all active partitions along with their volume load percentage and IP volume statistics; 2) if the volume load percentage of any IP addresses of a partition are less than the volume load percentage of other IP addresses of the partition, then check to see if a lean IP address is eligible/allowed to have the volume of outbound email increased based on the volume history of the lean IP address provided by the partition distribution component 108 while comparing the volume histories of the IP addresses of the partition; and/or 3) repeat until the lean IP has the same or similar load or volume percentage as the other IP addresses of the partition.

The IFD component 104 can use various commands (e.g., cmdlets) to create outbound rules for insertion into the database server 122 and/or move/update the settings of IP addresses for each partition. For example cmdlets can be configured as:

Cmdlet add-poolmember
This command adds an IP address to a Pool
Syntax: add-poolmember 1.2.3.4 PoolNameHere1
Example: add-poolmember add 1.2.3.4 OutboundSnatPool1
cmdlet remove-poolmember
Syntax: remove-poolmember 1.2.3.4 PoolNameHere1
Example: remove-poolmember 1.2.3.4 OutboundSnatPool1
Cmdlet get-poolmember
This parameter gives a dump of the current settings on partitions:
Syntax: get-poolmember list (OptionalDCName)
Example: get-poolmember ipcontrol comp4.

The client devices/systems described herein can be configured with at least one processor, system memory, and networking components. System memory can include volatile (e.g. random access memory (RAM)), non-volatile (e.g. read-only memory (ROM)), flash memory, etc. It will be appreciated that embodiments described herein may also be practiced in conjunction with other operating systems, device/system types, and/or other application programs. As will be appreciated, the client device/systems use the networking functionality to communicate and utilize functionality of remote systems, such as various servers and/or remote storage farms or locations.

Various embodiments can be used with a number of computer configurations, including hand-held devices, multiprocessor systems, microprocessor-based or programmable consumer electronics, minicomputers, mainframe computers, etc. Various embodiments can be implemented in distributed computing environments using remote processing devices/systems that communicate over a one or more communications networks. In a distributed computing environment, program modules or code may be located in both local and remote memory. Various embodiments can implement system-on-a-chip (SOC) features that may include one or more processors, graphics components, communication components, etc. For example, a SOC can include a central processing unit, a graphics processor, memory, USB controller, power management circuits, wireless radio(s) (WiFi, cellular, etc.), and/or other components. Various embodiments may be implemented as a process or method, a system, a device, or computer readable storage for example.

Figure 2:
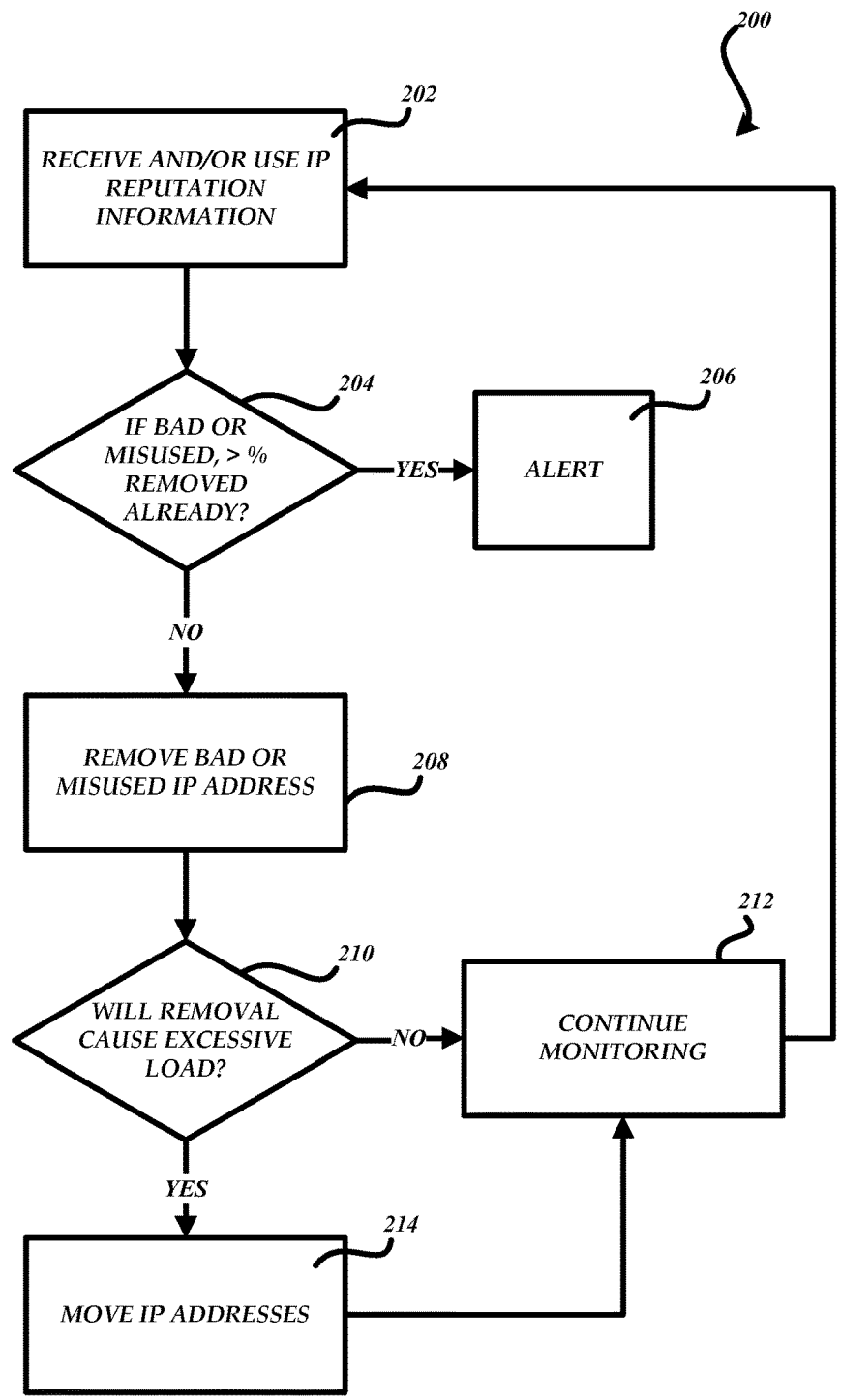
FIG. 2 is a flow diagram depicting an exemplary process of identifying and/or removing potentially misused IP addresses from a partition of a datacenter.

FIG. 2 is a flow diagram depicting an exemplary process 200 of identifying and/or removing bad and potentially misused IP addresses from a partition of a datacenter according to an embodiment. The process 200 at 202 begins by receiving and/or using reputation information associated with multiple IP addresses of one or more partitions of the datacenter. As described above, logical partitions of different IP addresses can be used to source outbound emails for customers that are associated with the datacenter. As an example, the process 200 at 202 can request IP reputation information to identify bad or misused IP addresses associated with one or more datacenter partitions and/or one or more customers.

If there is a bad or misused IP address at 204, the process 200 operates to check whether a certain number or percentage of IP addresses have been removed from the partition. If a certain number or percentage of IP addresses have been removed at 204, the process 200 proceeds to 206 and operates to provide an alert regarding the partition and/or IP address status. For example, if more than half or some other amount of the number of IP addresses have already been removed from a partition within a defined amount of time, the process 200 at 206 can operate to provide an alert to notify a responsible party or individual (e.g., an email, text, call, etc.), generate a support ticket, and/or trigger a workflow in attempting to correct the cause of the alert.

If a certain number or percentage of IP addresses have not been removed at 204, the process 200 continues to 208 and removes the bad or misused IP address from the partition. For example, the process 200 continues to 208 and removes the bad or misused IP address from the partition and moves it to a repair and recovery partition or other location to allow for future repair and reuse. If removal of the bad or misused IP address does not cause the remaining IP addresses to absorb more than a defined load or percentage of volume increase at 210, the process 200 proceeds to 212 and continues monitoring the partitions since the remaining IP addresses of the partition are able to absorb the additional load.

If, however, removal of the bad IP does cause the remaining IP addresses to absorb more than a defined percentage or volume increase at 210, the process 200 continues to 214 and moves or sources good or reputable IP addresses from one or more different partitions that have similar loads or volumes as compared to the removed IP address as part of accounting for the volumetric shortfall or additional load before returning to 212. For example, if the removed IP address was sending 500 emails a day, two IP addresses who are sending about 250 emails per day can be moved to compensate for the additional 500 email load. While a certain number and order of operations is described for the exemplary flow of FIG. 2, it will be appreciated that other numbers and/or orders can be used according to desired implementations.

Figure 3:
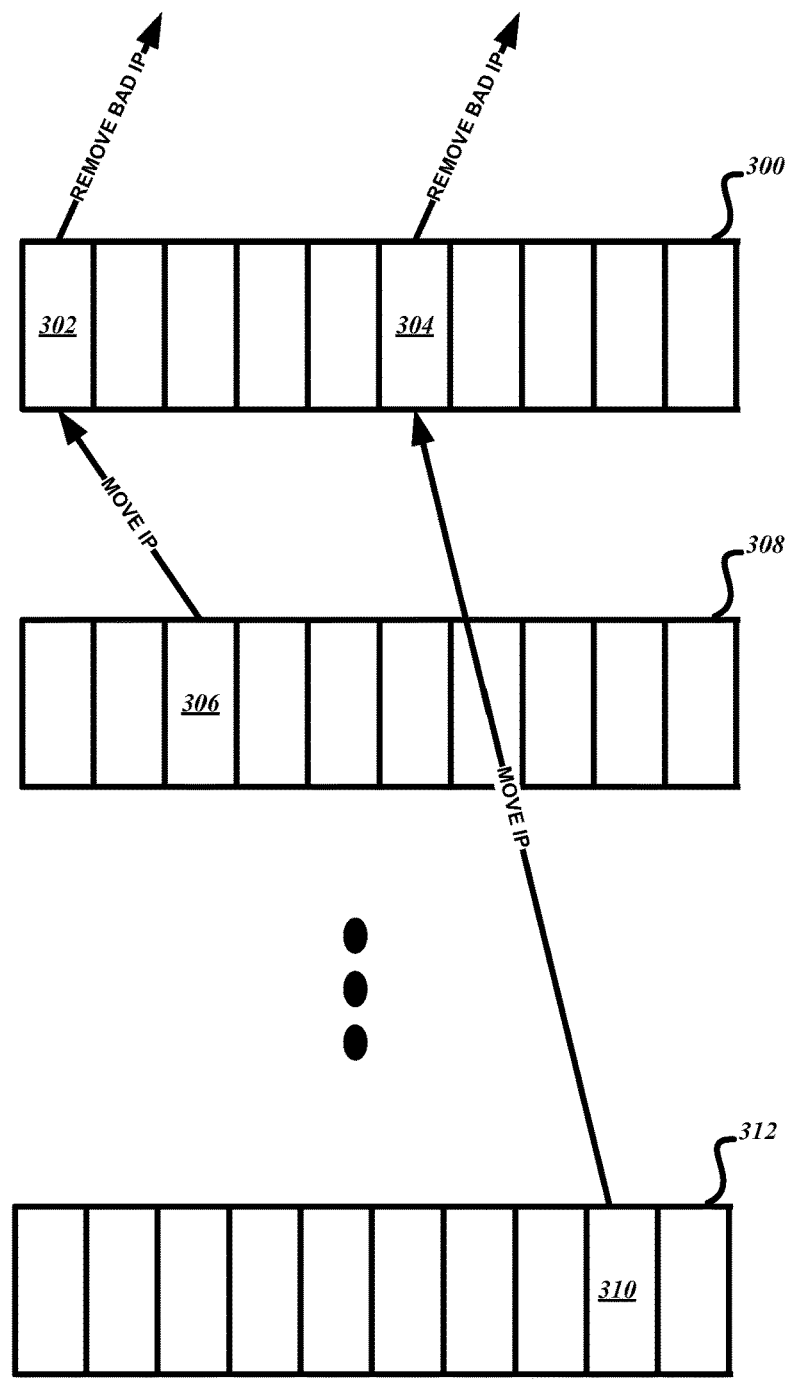
FIG. 3 depicts an example of accounting for a volumetric shortfall upon removing a bad IP address from a partition of a datacenter.

FIG. 3 depicts an example of using the process 200 as part of accounting for a volumetric shortfall upon removing a bad IP address from a partition of a datacenter. As shown in FIG. 3, an IP address 302 and an IP address 304 have been removed from a first partition 300 after being identified as a bad or potentially misused IP addresses. For this example, removal of the IP addresses 302 and 304 have resulted in a volumetric shortfall as the remaining IP addresses have to account for too much load. IP address 306 has been moved from partition 308 and IP address 310 has been moved from partition 312 to account for the additional load due to their similar volume reputations and histories. As described above, IP addresses 302 and 304 may be recycled and reused again to source outbound email communications.

Figure 4:
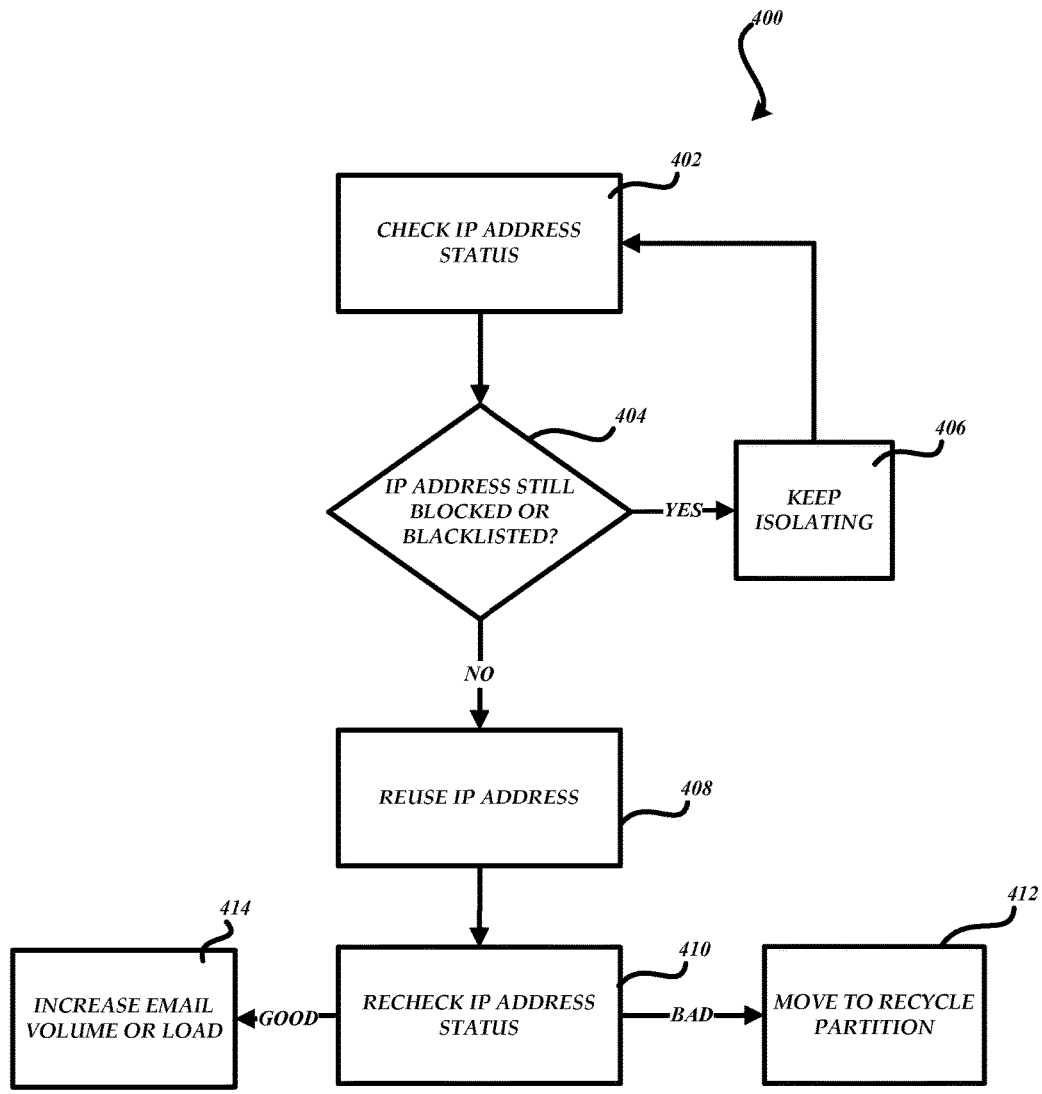
FIG. 4 is a flow diagram depicting an exemplary process of repairing a bad or misused IP address.

FIG. 4 is a flow diagram depicting an exemplary process 400 of repairing a bad or misused IP address according to an embodiment. At 402, the process 400 operates to check the status the IP address to determine current blocked or blacklisted status of one or more IP addresses to be recycled. If the IP address is still blocked at 404, the process 400 operates to keep the bad or misused IP address in a recycle partition at 406 and loop back to 402. If the IP address is no longer blocked at 404, the process 400 operates at 408 to reuse the previously marked bad or misused IP address with a new partition and start allowing sending of a preliminary volume of outbound email.

After a defined or configurable amount of time, the process 400 at 410 rechecks the IP address being recycled to determine if it has been blocked or otherwise compromised again. If the IP address being recycled is blocked or otherwise compromised at 410, the process 400 operates at 412 to mark the previously marked bad IP address as bad and move the bad IP to the recycle partition. If the previously marked bad IP address is not blocked or otherwise compromised at 410, the process 400 at 414 operates to continue increasing the email volume or load while continuing to check reputation and/or status over timed intervals until an outbound email volume is at a similar level or load as other IP addresses in the new partition before returning to 402. Recycled IP addresses provided by the process 400 can be reintroduced into a datacenter partition to begin sourcing outbound emails.

As an implementation example, the process 400 can operate to control a volumetric email increase for a candidate IP address that has sent an average of 100 emails per day with a 1% load on an associated partition. The other IP addresses in the partition have sent an average of 1000 emails per day and have a 10% load each. As such, each IP has an average load that matches a volume setting. The process 400 can increase the load on the candidate IP address incrementally such as from 1% load to 1.3% and so on for this example. Being able to recycle and repair IP addresses allows for an efficient IP address reuse. While a certain number and order of operations is described for the exemplary flow of FIG. 4, it will be appreciated that other numbers and/or orders can be used according to desired implementations.

Figure 5:
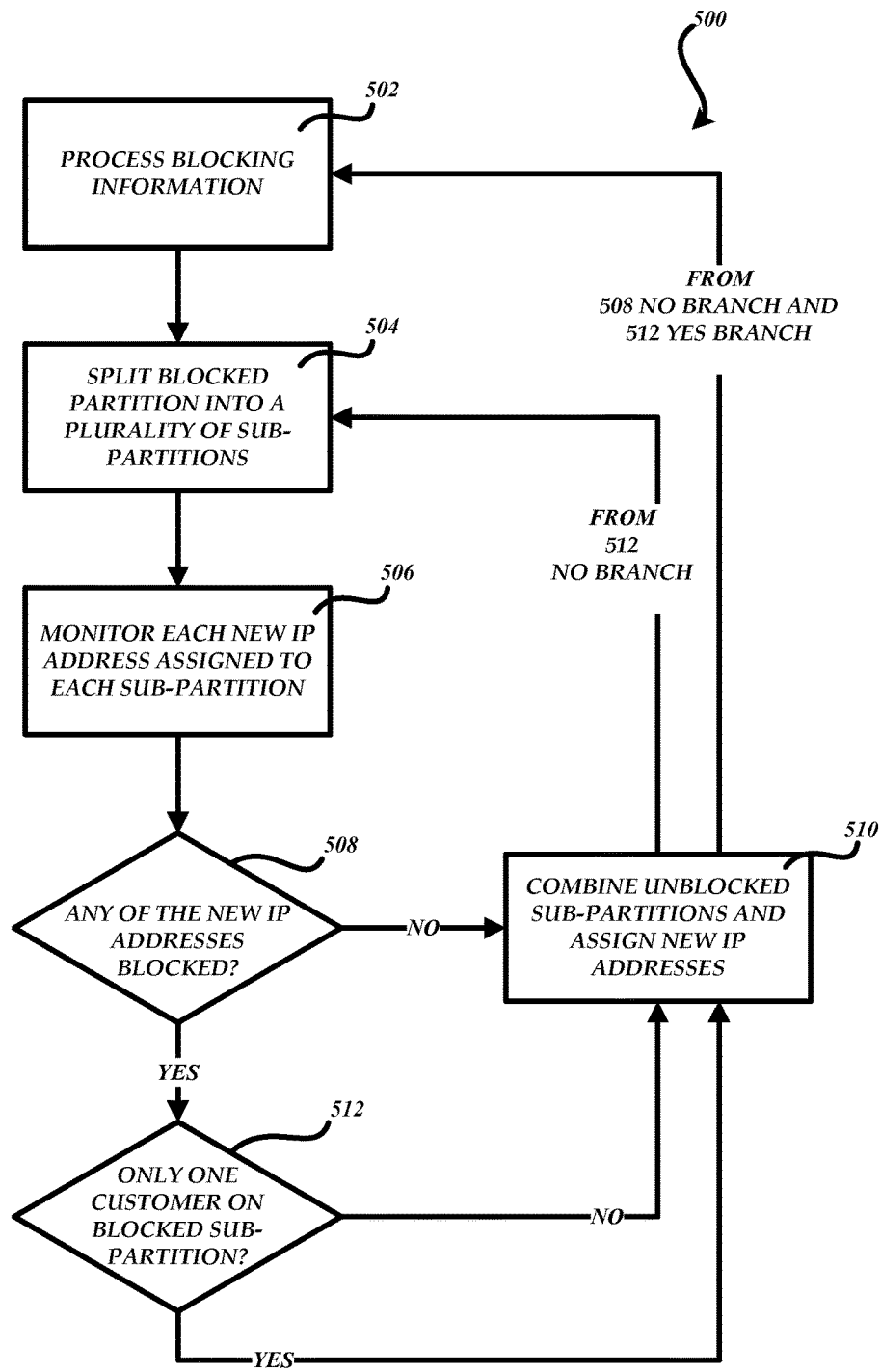
FIG. 5 is a flow diagram depicting an exemplary process of identifying and/or isolating potentially offending customers that may be misusing one or more IP addresses.

FIG. 5 is a flow diagram depicting an exemplary process 500 of identifying and/or isolating potentially offending customers that may be misusing one or more IP addresses associated with a partition of multiple IP addresses according to an embodiment. As an implementation example, the process 500 can be implemented in part using complex programming code and one or more server computers as part of an email hosting infrastructure that employs multiple partitions of IP addresses, wherein each partition can include multiple IP addresses to host outbound emails for multiple customers.

In one embodiment, the process 500 is activated when more than one IP address of a partition is blocked or otherwise identified as bad or potentially misused. The process 500 is configured to expeditiously isolate one or more customers who may be sending spam or other unwanted email communications. At 502, the process 500 of an embodiment operates to process and use information regarding the blocking of a partition due to the misuse or compromise of more than one IP address of the partition used to source outbound emails. For example, the process 500 at 502 can use an in-house IP reputation system and/or one or more third party systems to gather IP reputation information including blocked status, blacklisted status, lean volume status, etc.

At 504, the process 500 operates to split or divide a blocked partition into a plurality of sub-partitions and/or assign a new IP address and/or one or more customers associated with the original partition to each sub-partition of the plurality of sub-partitions. The process 500 can use random and/or definite assignments according to each particular implementation. For example, the process 500 at 504 can operate to split a partition servicing 100 customers into 10 sub-partitions (see FIG. 6 for example), wherein 10 customers and new (or recycled) IP addresses are assigned to each of the 10 sub-partitions. As such, each sub-partition uses one newly assigned IP address to continue serving one or more customers of the blocked partition.

At 506, the process 500 operates to monitor each new IP address of the sub-partitions for a defined amount of time (e.g., a defined number of hours) to identify and/or isolate any potentially offending customers. At 508, if none of the new IP addresses are blocked or otherwise identified as bad or potentially misused after the defined amount of time to monitor has passed, the process 500 proceeds to 510 and combines the unblocked sub-partitions back together into the original partition or a new partition while assigning new and/or recycled IP addresses to source emails for the re-combined customers of the unblocked sub-partitions before returning to 502.

If an IP address of one or more of the sub-partitions has been blocked or otherwise identified as bad or potentially misused at 508 and there is more than one customer associated with the one or more marked as bad sub-partitions at 512, the process 500 operates at 510 to combine the unblocked sub-partitions back together into the original partition or a new partition while assigning new or recycled IP addresses to source emails before returning to 504 and splitting or dividing the blocked or otherwise identified as bad or potentially misused sub-partitions into a number of additional sub-partitions. In an embodiment, the operation of combining at 510 follows the splitting of any blocked sub-partition into a number of additional sub-partitions.

The recombining of the unblocked sub-partitions enables reputable customers to operate again normally. Continuing the example above, suppose that two of the sub-partitions including 10 customers each were subsequently blocked, the process 500 at 504 can operate to split each affected sub-partition into 10 new sub-partitions that includes one customer per partition thereby expeditiously identifying and isolating any offending customer. With continuing reference to FIG. 5, if an IP address of one or more of the sub-partitions has been blocked or otherwise identified as bad or potentially misused at 508 but the associated sub-partition only includes one customer at 512, the process 500 returns to 502 as the problem has been mitigated by identifying any offending customers. Once one or more customers have been identified as offending, further action can be taken in attempts to enable the customer to rebuild its email reputation. While a certain number and order of operations is described for the exemplary flow of FIG. 5, it will be appreciated that other numbers and/or orders can be used according to desired implementations.

Figure 6:
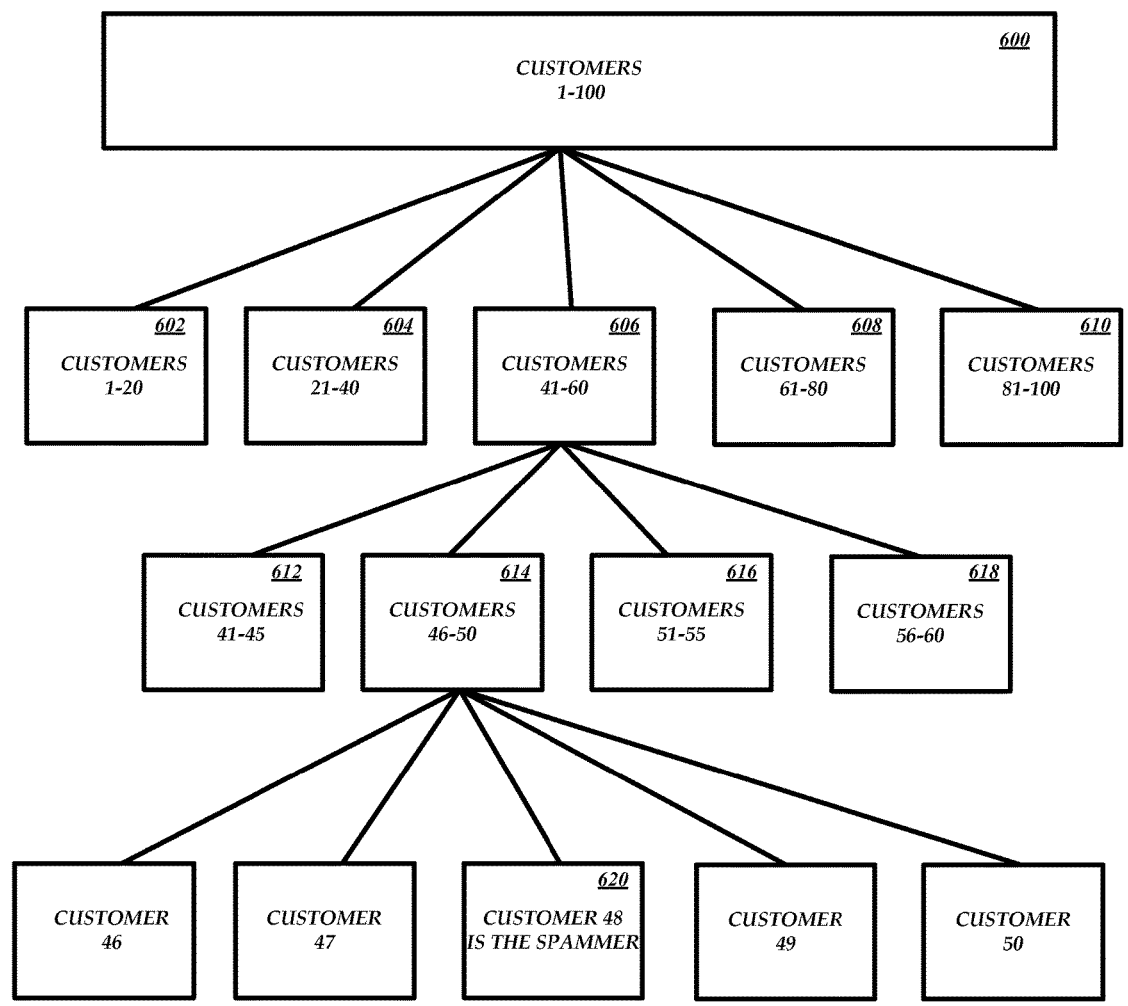
FIG. 6 depicts an example of dividing a partition serving customers into multiple levels of sub-partitions.

FIG. 6 depicts an example of sub-dividing a partition 600 serving 100 customers into multiple levels of sub-partitions using the process 500 as part of identifying a datacenter customer having email practices that have resulted in multiple IP addresses being blocked. As shown in FIG. 6, the partition 600 has been divided into 5 first level sub-partitions 602-610, wherein a new IP address is assigned to each of the sub-partitions as described above. Customers 1-20 have been assigned to sub-partition 602, customers 21-40 have been assigned to sub-partition 604, customers 41-60 have been assigned to sub-partition 606, customers 61-80 have been assigned to sub-partition 608, and customers 81-100 have been assigned to sub-partition 610. As described above, the sub-partitions 602, 604, 608, and 610 can be re-combined into the original partition or a new partition.

After being blocked or marked as bad, sub-partition 606 has been divided into 4 second level sub-partitions, wherein a new IP address is assigned to each sub-partition. Since sub-partition 606 has been blocked, process 500 divides sub-partition 606 such that customers 41-45 have been assigned to sub-partition 612, customers 46-50 have been assigned to sub-partition 614, customers 51-55 have been assigned to sub-partition 616, and customers 56-60 have been assigned to sub-partition 618.

After being blocked or marked as bad, the process 500 has operated to divide sub-partition 614 into 5 third level sub-partitions, one sub-partition for each customer, wherein a new IP address is assigned to each sub-partition. For this example, third level sub-partition 620 has been blocked and customer 48 has been identified as the spamming or offending customer. For this example, the amount of dividing differs from level to level but may also be the same amount of dividing at each level depending in part on the number of customers and/or IP addresses.

It will be appreciated that various features described herein can be implemented as part of a processor-driven computer environment including hardware and software components. Also, while certain embodiments and examples are described above for illustrative purposes, other embodiments are included and available, and the described embodiments should not be used to limit the claims. Suitable programming means include any means for directing a computer system or device to execute steps of a process or method, including for example, systems comprised of processing units and arithmetic-logic circuits coupled to computer memory, which systems have the capability of storing in computer memory, which computer memory includes electronic circuits configured to store data and program instructions or code.

An exemplary computer program product is useable with any suitable data processing system. While a certain number and types of components are described above, it will be appreciated that other numbers and/or types and/or configurations can be included according to various embodiments. Accordingly, component functionality can be further divided and/or combined with other component functionalities according to desired implementations. The term computer readable media as used herein can include computer storage media or computer storage. The computer storage of an embodiment stores program code or instructions that operate to perform some function. Computer storage media can include volatile and nonvolatile, removable and non-removable media implemented in any method or technology for storage of information, such as computer readable instructions, data structures, program modules, etc.

System memory, removable storage, and non-removable storage are all computer storage media examples (i.e., memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computing device. Any such computer storage media may be part of a device or system. By way of example, and not limitation, communication media may include wired media such as a wired network or direct-wired connection, and wireless media such as acoustic, RF, infrared, and other wireless media.

The embodiments and examples described herein are not intended to be limiting and other embodiments are available. Moreover, the components described above can be implemented as part of networked, distributed, and/or other computer-implemented environment. The components can communicate via a wired, wireless, and/or a combination of communication networks. Network components and/or couplings between components of can include any of a type, number, and/or combination of networks and the corresponding network components which include, but are not limited to, wide area networks (WANs), local area networks (LANs), metropolitan area networks (MANs), proprietary networks, backend networks, cellular networks, etc.

Client computing devices/systems and servers can be any type and/or combination of processor-based devices or systems. Additionally, server functionality can include many components and include other servers. Components of the computing environments described in the singular tense may include multiple instances of such components. While certain embodiments include software implementations, they are not so limited and encompass hardware, or mixed hardware/software solutions.

Terms used in the description, such as component, module, system, device, cloud, network, and other terminology, generally describe a computer-related operational environment that includes hardware, software, firmware and/or other items. A component can use processes using a processor, executable, and/or other code. Exemplary components include an application, a server running on the application, and/or an electronic communication client coupled to a server for receiving communication items. Computer resources can include processor and memory resources such as: digital signal processors, microprocessors, multi-core processors, etc. and memory components such as magnetic, optical, and/or other storage devices, smart memory, flash memory, etc. Communication components can be used to communicate computer-readable information as part of transmitting, receiving, and/or rendering electronic communication items using a communication network or networks, such as the Internet for example. Other embodiments and configurations are included.

Figure 7:
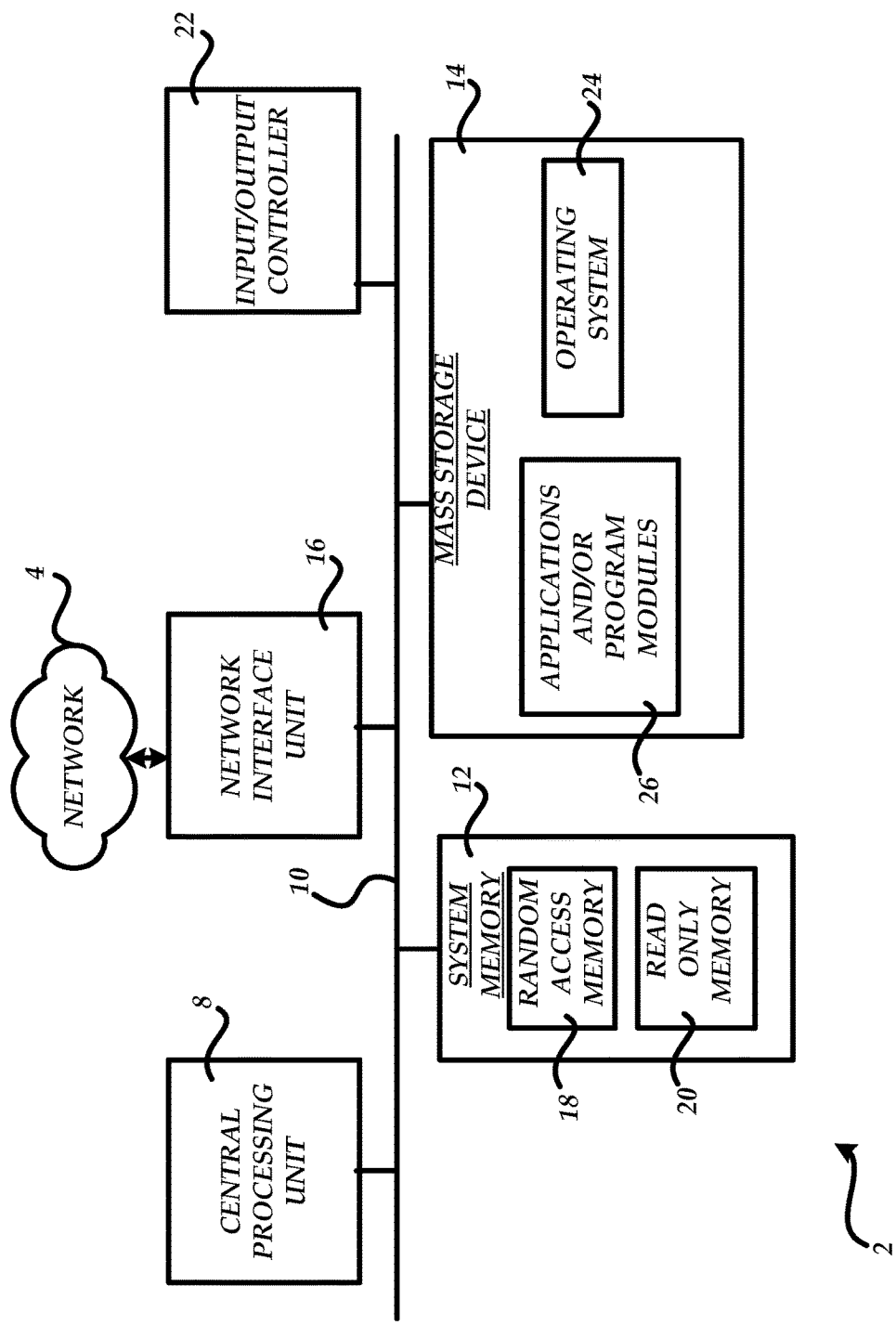
FIG. 7 is a block diagram illustrating an exemplary computing environment for implementation of various embodiments.

Referring now to FIG. 7, the following provides a brief, general description of a suitable computing environment in which embodiments be implemented. While described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

As shown in FIG. 7, computer 2 comprises a general purpose server, desktop, laptop, handheld, or other type of computer capable of executing one or more application programs including an email application or other application that includes email functionality. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 24, application programs, and other program modules/resources 26.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

According to various embodiments, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of other devices, including a keyboard, mouse, etc. (not shown). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 24 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store application programs, such as word processing, spreadsheet, drawing, e-mail, and other applications and/or program modules, etc.

Figure 8:
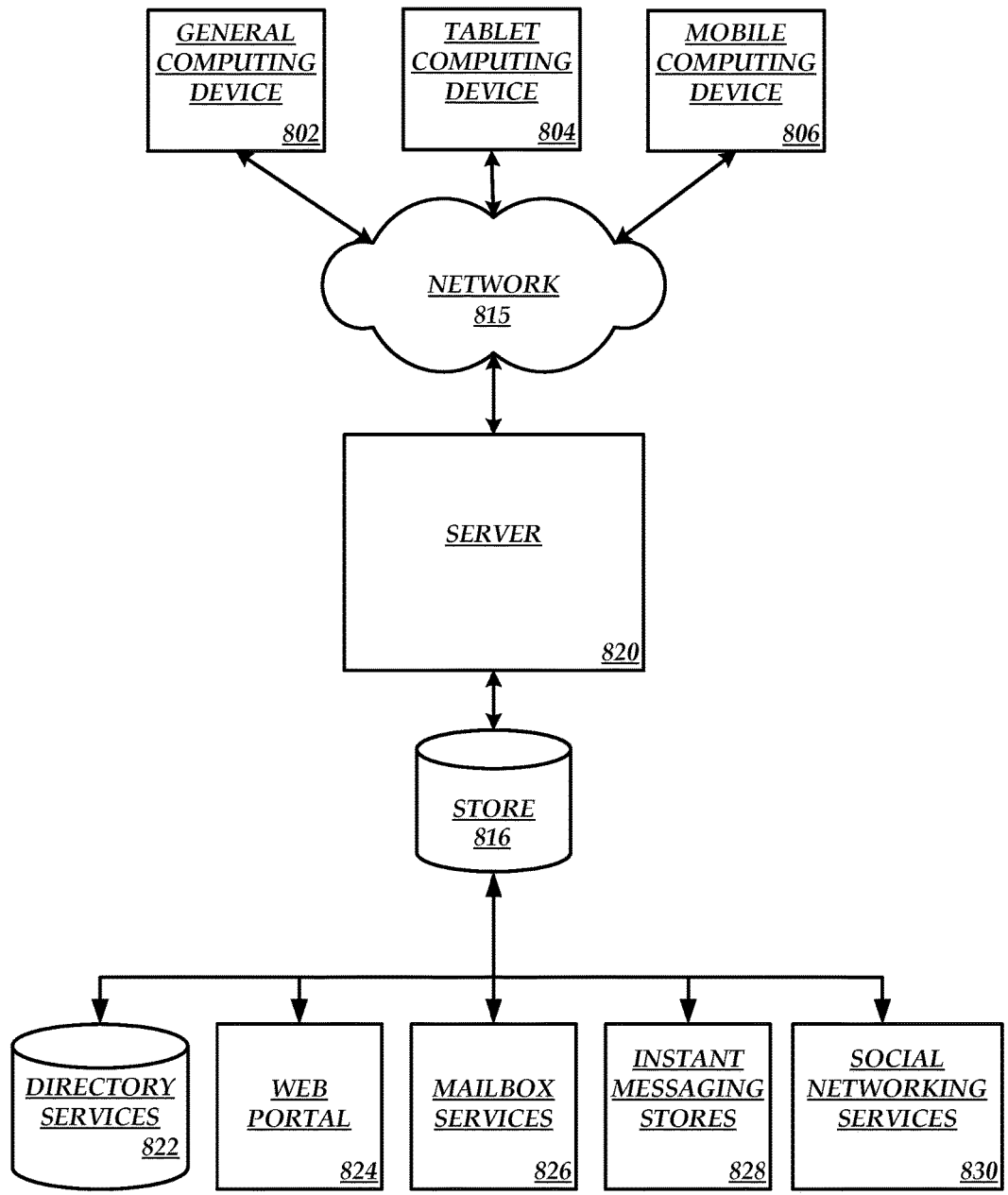
FIG. 8 illustrates one embodiment of the architecture of a system implementing partitioning features to source outbound emails.

FIG. 8 illustrates one embodiment of the architecture of a system implementing partitioning features to source outbound emails. Content, including partitioning and addressing information may be stored in different communication channels or storage types. For example, various information may be stored using a directory service 822, a web portal 824, a mailbox service 826, an instant messaging store 828, and/or a social networking site 830. A server 820 may provide various infrastructure distribution features to customer. As one example, the server 820 may provide rules that are used to distribute outbound email using a number of datacenter partitions over network 815, such as the Internet or other network(s) for example. By way of example, the client computing device may be implemented as a general computing device 802 and embodied in a personal computer, a tablet computing device 804, and/or a mobile computing device 806 (e.g., a smart phone). Any of these clients may use content from the store 816.

Embodiments of the invention, for example, are described above with reference to block diagrams and/or operational illustrations of methods, systems, and computer program products. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

It should be appreciated that various embodiments can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A system comprising a processor operatively coupled to a device, the device storing instructions that when executed, perform a method, the method comprising:
    identifying a misused IP address in a first partition that includes a first plurality of IP addresses;
    removing the misused IP address from the first partition;
    determining an increase in volume absorbed by remaining IP addresses in the first partition in response to a volumetric shortfall of reputable IP addresses in the first partition based on the removal of the misused IP address from the first partition;
    when the increase in volume is greater than a threshold:
        identifying at least a second partition that includes a second plurality of IP addresses;
        identifying one or more additional IP addresses in the second plurality of IP addresses to compensate for the volumetric shortfall; and
        moving the one or more additional IP addresses to the first partition; and
    when the increase in volume is not great than the threshold, using the first plurality of IP addresses in the first partition to source outbound email communications.

2. The system of claim 1, the method further comprising:
    reusing the misused IP address by including the misused IP address in a different partition and increasing a volume of outbound email communications over time using the misused IP address.

3. The system of claim 2, the method further comprising:
    increasing the volume of outbound email communications using the misused IP address until the volume of outbound email communications is equal or substantially equal to a volume of outbound email communications sourced by the different IP addresses.

4. The system of claim 3, the method further comprising:
    sourcing the different IP addresses from the partition based on a volume of outbound email communications sent by the different IP address over a defined amount of time.

5. The system of claim 1, the method further comprising:
    taking a corrective action after a number of IP addresses have been removed from the partition.

6. The system of claim 1, wherein the misused IP address is one that has been blocked or blacklisted.

7. The system of claim 1, wherein the misused IP address has been blocked based on a reputation of the misused IP address.

8. A computer implemented method, performed by at least one processor, comprising:
    identifying a misused IP address in a first partition that includes a first plurality of IP addresses;
    removing the misused IP address from the first partition;
    determining an increase in volume absorbed by remaining IP addresses in the first partition in response to a volumetric shortfall of reputable IP addresses in the first partition based on the removal of the misused IP address from the first partition;
    when the increase in volume is greater than a threshold:
        identifying at least a second partition that includes a second plurality of IP addresses;
        identifying one or more additional IP addresses in the second plurality of IP addresses to compensate for the volumetric shortfall; and
        moving the one or more additional IP addresses to the first partition;
    when the increase in volume is not great than the threshold, using the first plurality of IP addresses in the first partition to source outbound email communications.

9. The method of claim 8, the method further comprising:
    reusing the misused IP address by including the misused IP address in a different partition and increasing a volume of outbound email communications over time using the misused IP address.

10. The method of claim 9, the method further comprising:
increasing the volume of outbound email communications using the misused IP address until the volume of outbound email communications is equal or substantially equal to a volume of outbound email communications sourced by the different IP addresses.

11. The method of claim 10, the method further comprising:
sourcing the different IP addresses from the partition based on a volume of outbound email communications sent by the different IP address over a defined amount of time.

12. The method of claim 8, the method further comprising:
taking a corrective action after a number of IP addresses have been removed from the partition.

13. The method of claim 12, wherein the misused IP address is one that has been blocked or blacklisted.

14. The method of claim 13, wherein the misused IP address has been blocked based on a reputation of the misused IP address.

15. A device storing instructions that when executed are capable of performing a method, the method comprising:
identifying a misused IP address in a first partition that includes a first plurality of IP addresses;
removing the misused IP address from the first partition;
determining an increase in volume absorbed by remaining IP addresses in the first partition in response to a volumetric shortfall of reputable IP addresses in the first partition based on the removal of the misused IP address from the first partition;
when the increase in volume is greater than a threshold:
identifying at least a second partition that includes a second plurality of IP addresses;
identifying one or more additional IP addresses in the second plurality of IP addresses to compensate for the volumetric shortfall; and
moving the one or more additional IP addresses to the first partition;
when the increase in volume is not great than the threshold, using the first plurality of IP addresses in the first partition to source outbound email communications; and
moving the misused IP address to the first partition after a predetermined time, wherein the misused IP address is a non-misused IP address after the predetermined time.

16. The device of claim 15, the method further comprising:
reusing the misused IP address by including the misused IP address in a different partition and increasing a volume of outbound email communications over time using the misused IP address.

17. The device of claim 16, the method further comprising:
increasing the volume of outbound email communications using the misused IP address until the volume of outbound email communications is equal or substantially equal to a volume of outbound email communications sourced by the different IP addresses.

18. The device of claim 17, the method further comprising:
sourcing the different IP addresses from the partition based on a volume of outbound email communications sent by the different IP address over a defined amount of time.

19. The device of claim 15, further comprising:
taking a corrective action after a number of IP addresses have been removed from the partition.

20. The device of claim 15, wherein the misused IP address is one that has been blocked or blacklisted.

* * * * *